United States Patent [19]

Davis et al.

[11] 4,098,231

[45] Jul. 4, 1978

[54] APPARATUS FOR IMPROVING THE EFFICIENCY AND REDUCING THE HYDROCARBON EMISSIONS OF CARBURETED ENGINES

[76] Inventors: Oliver Thurston Davis, Rte. 1, Box 33; Norman R. Jones, Rte. 2, both of Dunlop, Tenn. 37327; Elmer Carl Eddy, Rte. 1, Box 258, Whitwell, Tenn. 37397

[21] Appl. No.: 796,752

[22] Filed: May 13, 1977

[51] Int. Cl.$^2$ ............................................. F02D 19/00
[52] U.S. Cl. ................................. 123/25 B; 123/25 R
[58] Field of Search ............... 123/25 B, 25 D, 25 P, 123/25 R; 261/18 A

[56] References Cited

U.S. PATENT DOCUMENTS

| | | | |
|---|---|---|---|
| 1,512,242 | 10/1924 | Schmitt | 123/25 B |
| 1,543,732 | 6/1925 | Staley | 123/25 B |
| 1,631,362 | 6/1927 | Colliard | 123/25 B |
| 2,184,141 | 12/1939 | Dodge | 123/25 B |
| 2,674,235 | 4/1954 | Drydyke | 123/25 B |
| 2,977,940 | 4/1961 | Theriault | 123/25 B |
| 3,044,453 | 7/1962 | Hoffmann | 123/25 B |
| 3,641,769 | 2/1972 | Vizza | 123/25 B X |

*Primary Examiner*—Charles J. Myhre
*Assistant Examiner*—Ira S. Lazarus

[57] ABSTRACT

An apparatus is disclosed for improving the efficiency and reducing the hydrocarbon exhaust emissions of combustion engines having a circulating water cooling system and a carburetor having a vacuum inlet port and a fuel inlet port and a fuel pump connected between the fuel inlet port and a fuel tank. In addition, a heat exchanger having a first tank is connected to the circulating water system to provide heat to a tube passing through the first tank and connected between the fuel tank and the fuel pump to expand the fuel in the tube. A second tank partially filled with water is in heat exchange relationship with the first tank and it has a pipe for introducing air into the water. An additional pipe is provided for connecting the unfilled part of the second tank to the vacuum inlet port of the carburetor for drawing air from the air pipe through the water when it absorbs moisture before transmission to the carburetor.

8 Claims, 1 Drawing Figure

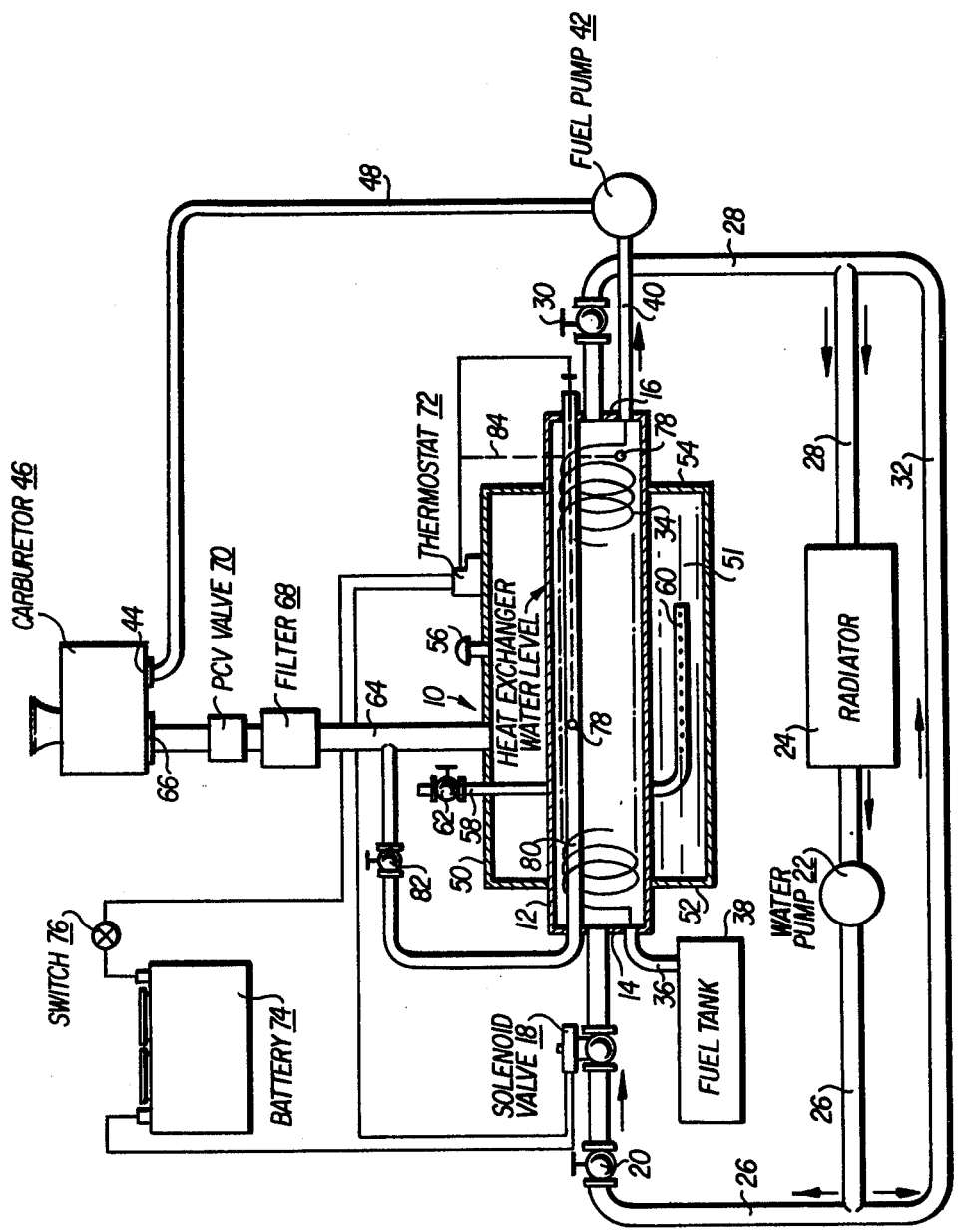

APPARATUS FOR IMPROVING THE EFFICIENCY AND REDUCING THE HYDROCARBON EMISSIONS OF CARBURETED ENGINES

BACKGROUND OF THE INVENTION

This invention relates to fuel systems for combustion engines and more particularly to an apparatus for heating and expanding the fuel to increase the operating efficiency of the engine and to introduce moisture laden air into the carburetor to reduce hydrocarbon emissions from the engines exhaust.

Numerous devices have been developed in recent years in an attempt to increase the operating efficiency of the internal combustion engine. Some devices, although successful in increasing the efficiency significantly have, in the process, substantially increased the hydrocarbon content of the exhaust emitted by the engine to levels prohibited by law. Other devices have been devised for reducing pollutants in the engines exhaust but these devices are often not only complex and costly in themselves but in many instances reduce the efficiency of the engine to unacceptable levels.

It is, therefore, the primary object of the present invention to provide a new device which is both capable of substantially increasing the operating efficiency of internal combustion engines while at the same time greatly reducing the hydrocarbon level in the exhaust.

It is another object of the invention to provide a device capable of being attached to a carbureted automobile engine for improving its performance by expanding the fuel to obtain better gasoline mileage and produce a measured amount of moisture ladened warm air for mixture in the carburetor to insure more complete burning of the fuel and thus reduce hydrocarbons.

It is yet another object of the invention to provide a device which utilizes the heat from the automobile cooling system for both expanding the fuel and providing the warm, moisture laden air.

It is a further object of the invention to provide a device which can be adapted to engines in use without modification of the structure of the engine and which is of relatively inexpensive and simple construction.

These together with other objects and advantages which will become subsequently apparent reside in the details of construction and operation as more fully hereinafter described and claimed, reference being had to the accompanying drawings forming a part hereof, wherein like characters of reference refer to like parts throughout the drawing.

DESCRIPTION OF THE DRAWING

The drawing is a diagrammatic illustration of the apparatus of the present invention attached to the fuel and cooling system of an internal combustion engine.

DESCRIPTION OF THE PREFERRED EMBODIMENT

In an embodiment of the invention chosen for the purpose of illustration a heat exchanger indicated generally by numeral 10 is shown comprising a first tank 12 preferably of cylindrical shape having end walls 14, 16. One end wall 14 is connected, via an electric solenoid actuated flow control valve 18 and a conventional manually operated control valve 20, to the outlet side of the water pump 22 and radiator 24 of an automobile engine's (not shown) cooling system by means of a conduit 26. The other end wall 16 is connected by means of conduit 28 to the inlet side of the radiator 24 via a conventional, manually operated control valve 30. A conduit 32 is shown connected in parallel with the heat exchanger 10 and radiator-water pump 24, 22 and it represents the balance of the normal automobile cooling system.

A series of coils 34 are positioned in the first tank 12 and have their ends extending through the end walls 14, 16 respectively. The end of coil 34 extending through end wall 14 is connected by piping 36 to the fuel tank 38 and the end of coil 34 extending through end wall 16 is connected by piping 40 to the vehicle fuel pump 42. The fuel pump 42 is in turn connected to the fuel inlet port 44 of the engine carburetor 46 by way of piping 48. A second tank 50, also preferably cylindrical in shape, is positioned about first tank 12 and coaxial therewith. The second tank 50 has end walls 52, 54 secured in watertight sealing engagement with the cylindrical wall of first tank 12. The second tank 50 is filled with water 51 through cap 56 to approximately the top of first tank 12. A pipe 58 is also provided which extends through the wall of second tank 50 into the water 51 in an area near the bottom of the second tank 50 as viewed in the drawing. The pipe 58 has a plurality of small holes found adjacent the capped end thereof for a purpose to be more fully described later. The pipe 58 has a manually actuated valve 62 adjacent the other end thereof to control the amount of air entering the pipe 58.

The space in second tank 50 above the water level is connected by pipe 64 to a vacuum port 66 associated with carburetor 46. The port 66 is the port in which, on present day carburetors, the fumes from the engine crankcase etc. are returned to the carburetor 46 for mixture with the regular fuel/air mixture to reduce exhaust pollutants. Also located in series with pipe 64 prior to its connection to vacuum port 66 are a filter 68 and a pressure control valve (pcv) 70 for maintaining the vacuum in pipe 64 between 15 and 21 inches of mercury.

Applicants have found that considerably greater engine efficiency in terms of miles per gallon is realized if the fuel pump is located between the heat exchanger 10 and the carburetor 46 rather than connected between the fuel tank 38 and the heat exchanger 10 where it is normally found in prior art systems of this general type. One possible explanation for this increased efficiency may reside in the fact that if expanded gas is produced by the heat exchanger 10 and mixed with air in carburetor 46 which it is to achieve a certain engine speed and inasmuch as the quantity of gasoline pumped by pump 42 is proportional to the engine speed, the system will remain more closely in balance i.e. the amount of fuel consumed equals the amount supplied than if the engine were consuming expanded gasoline at a certain speed and the pump supplying unexpanded gasoline at a rate proportional to that speed. In any event, because the fuel pumpted by pump 42 is warmed, expanded gasoline, the temperature of the expanded gasoline is extremely critical and must be maintained at a temperature below that which would cause a vapor lock to develop in the fuel pump 42 thus hampering or shutting down the entire operation of the engine. Applicants have found that to prevent the aforementioned vapor lock from occuring, the temperature of the gasoline entering fuel pump 42 must be maintained between 100 and 110 degrees Fahrenheit.

In order to accurately control the temperature of the gasoline passing through coil 34 in the first tank 12, manual control valves 20, 30 are adjusted so that the flow rate through the coil 34 is very slow, i.e. considerably slower than that passing through piping 34. In addition, a thermostatic type switch 72 is provided which is electrically connected in series with solenoid valve 18, the vehicle's battery 74, and an on-off switch 76. The thermostate 72 has a sensing element 78 associated therewith. The sensing element 78, it has been found, can be positioned in either of two places to achieve the accuracy required. The first location is a tube 80 positioned through end walls 14, 16 of the first tank 12 and in the tank 12 adjacent the coils 34. One end of the tube 80 is connected to piping 64 via a manual control valve 82 and the other end is open to receive the sensing element 78. The sensing element 78 is inserted in the pipe 80 until it reaches the approximate midpoint thereof. The valve 82 is opened sufficiently so that a very slow and slight stream of air from the engine compartment is caused to be heated by the circulating coolent in first tank 12 and drawn across sensing element 78. This location of the sensing element 78 may yield the most accurate results if the entire system disclosed is required to be located very near the engine where heat from the engine itself has an effect on the temperature of the fuel in piping 40, 48. If the system can be installed in a location where there is more circulating air, the sensing element 78 can be inserted directly into the path of the coolent moving through first tank 12 as shown by phantom lines (84). By expanding the gasoline in heat exchanger 10, more of a given original quantity of the fuel will be available for mixing in the carburetor and this is thus one factor of applicant's invention which contributes to greater engine efficiency. The other factor is the introduction of hydrogen and oxygen in the form of warm water vapor to the carburetor's air-fuel mixture to enhance the combustion process in the engines chambers.

To provide this warm water vapor, second tank 50 is filled with water 51 to approximately the top of first tank 12 by way of filler cup 56. The water 51 in second tank 50 is in heat exchange relationship with the wall of first tank 12 and thus absorbs heat therefrom which is developed when the combustion engine is started. With the engine thus running and at the same time, a vacuum is caused to exist at vacuum port 66 of carburetor 46. This vacuum is transmitted to the space in second tank 50 above the water level therein. The vacuum in the space causes air to be induced into the water from holes 60 in pipe 58. If the control valve 62 is carefully adjusted and the holes 60 are sufficiently small, tiny streams of bubbles bubble up through the water 51 which has been heated by the engine's cooling system. With the water 51 heated and the surface thereof subject to a vacuum, the water will easily vaporize at its surface. The air bubbles emerging from the surface of the water pick up the moist gaseous vapors and by the vacuum present, they are carried through pipe 64, filter 68, pressure control valve 70 into carburetor 46. The moist gaseous vapors are introduced into the fuel-air mixture as it leaves the outlet of carburetor 46 and enters the intake manifold of the engine. The resulting mixture of fuel-air-moist gaseous vapors is considerably more volatile than just the conventional mixture which results in more complete burning in the combustion chambers of the engine. This more complete burning results in less pollution in the exhaust emissions in the form of unburned hydrocarbons. The precise amount of moist gaseous vapors entering the fuel-air mixture can be controlled, as aforementioned, by valve 62 together with the temperature of the water 51 which is held closely between 100° and 110° Fahrenheit.

In one test of the device of the present invention, a 1970 Chevrolet Station Wagon with a 350 cu. in. engine driven between 50–55 mph (miles per hour) without the device got 15.3 mpg (miles per gallon) and had hydrocarbon emissions of 300 ppm (parts per million) and carbon monoxide emissions of 1%. Equipped with the present device driven over the same course at the same speeds this Chevrolet Station Wagon got 29 mpg with 50 ppm hydrocarbon emmissions and 0.5% carbon monoxide emissions.

In another test, a 1976 Chevrolet pick-up truck, with a 6 cylinder engine and driven between 50–55 mph got, without the device of the present invention, 12.25 mpg with 40 ppm hydrocarbon emission and 0.2% carbon monoxide emissions. With the device of the present invention connected, the truck got 21 mpg with 15 ppm hydrocarbon emissions and 0.1% carbon monoxide emissions.

In yet another test, a 1976 Ford LTD Automobile with a 400 cu. in. engine driven between 50–55 mph got 10 mpg with only the manufacturers pollution control equipment installed. With the manufacturers pollution control equipment removed it got 14 mpg and had 450 ppm hydrocarbon emissions and 1% carbon monoxide emissions. With the device of the present invention installed it got 26 mpg with 200 ppm hydrocarbons and 0.4% carbon monoxide.

The results of the foregoing tests would, of course, vary depending on the driver, traffic conditions, ambient temperature etc., however, the basic fact that the device of the present invention substantially increases the efficiency of a variety of types of vehicles and engines while at the same time reducing the hydrocarbon and carbon monoxide content of the emissions is apparent.

To those skilled in the art to which this invention pertains, many changes in construction and widely differing embodiments and applications of the invention will suggest themselves without departing from the spirit and scope of the invention. The disclosures and the description herein are purely illustrative and are not intended to be in any sense limiting.

What we claim is:

1. An apparatus for improving the efficiency and reducing the hydrocarbon exhaust emissions of combustion engines having a circulating water cooling system and a carburetor having a vacuum inlet port and a fuel inlet port, and a fuel pump connected between said fuel inlet port and a fuel tank including in combination:
    (a) A heat exchanger having a first tank means with an inlet and outlet connected to said circulating water cooling system to supply heat, said first tank having first tube means therein connected in between said fuel tank and said fuel pump whereby said fuel is expanded by said circulating heated water before entering said fuel pump, and
    (b) second tank means partially filled with water in heat exchange relationship with said first tank, said second tank having means for introducing air into said water and pipe means connecting the unfilled part of said second tank to said vacuum inlet port of said carburetor for drawing air form said introduction means through said water into said carburetor.

2. An apparatus as set forth in claim 1 further comprising:

(a) second tube means extending through said first tank means in heat exchange relationship with said water, one end of said second tube means being connected to said vacuum inlet port;
(b) heat sensor means positioned in the other end of said second tube means;
(c) electric switch means actuated by said heat sensor when a predetermined temperature is reached; and
(d) electrically actuated valve means connected in said cooling system to control the flow of fluid therein, in response to actuation of said switch means.

3. An apparatus as set forth in claim 2 wherein said first tube means is spiral.

4. An apparatus as set forth in claim 2 wherein said means for introducing air into said water is a pipe extending through said first tank means into said water; said pipe having at the submerged end thereof, a plurality of small holes formed therein and at the other end thereof, a valve for controlling the quantity of air being introduced thereto.

5. An apparatus as set forth in claim 2 further comprising a pressure regulating valve means connected in said pipe between said carburetor vacuum inlet port and said unfilled part of said second tank.

6. An apparatus as set forth in claim 2 wherein said thermostat is set to maintain the temperature of said water in said first tank means at between 100° and 110° Fahrenheit.

7. An apparatus as set forth in claim 2 wherein said second tank means has port means for introducing water thereto.

8. An apparatus as set forth in claim 1 further comprising:
(a) heat sensor means positioned in said water;
(b) electric switch means actuated by said heat sensor when a predetermined temperature is reached; and
(c) electrically actuated valve means connected in said cooling system to control the flow of fluid therein in response to actuation of said switch means.

* * * * *